Dec. 14, 1937.  T. E. D. BILDE  2,102,352

COOKING RANGE WITH MUFFLE OVEN

Filed Nov. 16, 1933  2 Sheets-Sheet 1

Inventor

Tord E. D. Bilde

By William C. Linton
Attorney.

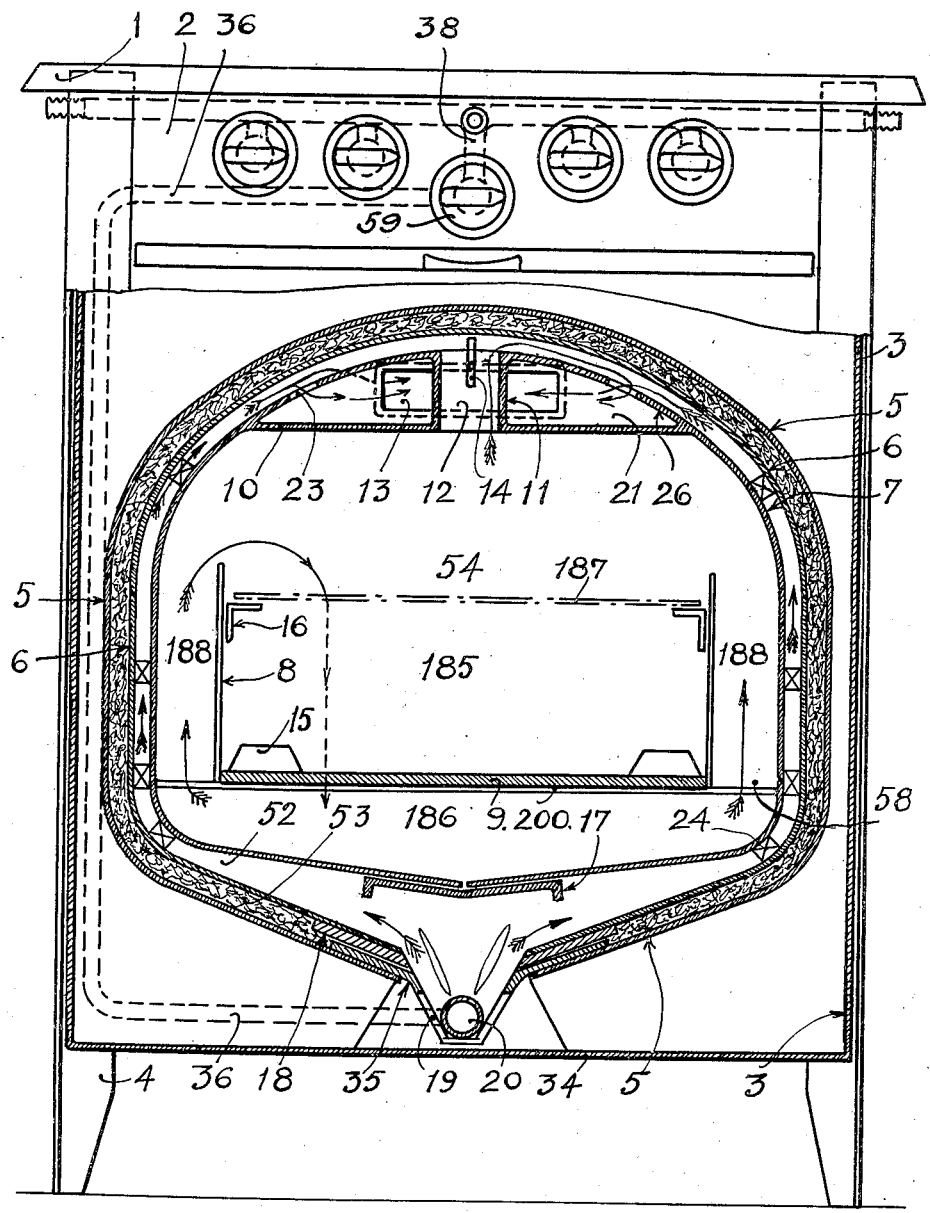
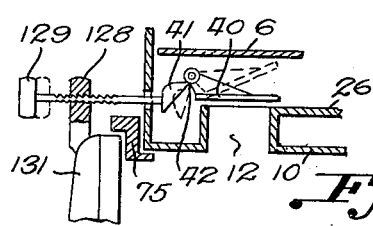
Fig. 2.
Fig. 3.
Inventor
Tord E. D. Bilde
By William C. Linton.
Attorney Patented Dec. 14, 1937

2,102,352

UNITED STATES PATENT OFFICE 2,102,352

COOKING RANGE WITH MUFFLE-OVEN

Tord Erik Daniel Bilde, Stockholm, Sweden

Application November 16, 1933, Serial No. 698,338
In Sweden February 23, 1933

1 Claim. (Cl. 126—39)

This invention relates to baking or like ovens adapted to be heated by gaseous, solid or liquid fuels and to devices for regulating the supply of gas to and of air from the said baking oven.

In accordance with one feature of the present invention the baking oven comprises a baking or like space constructed to be heated externally by the products of combustion of the fuel, means to prevent the entry of said combustion gases into the baking space and means for producing automatically a pre-determined circulation of heated air within said space.

The baking oven of the invention also includes a closed baking space, a heating channel surrounding the baking space, and receiving hot combustion gases and an insulating jacket surrounding the heating channel.

Further features of the invention include the arrangement of a flue gas chamber located above the oven through which the products of combustion and if desired also the air and gases from the oven itself must pass. The said arrangement providing also a thermally insulated space above the oven.

The invention will be hereinafter more particularly described with reference to the accompanying drawings, in which:—

Fig. 2 is a front elevation of the stove, the oven part being in section in a plane at right angles to Fig. 1.

Fig. 3 is a cross sectional view of a flap valve.

Figure 1:
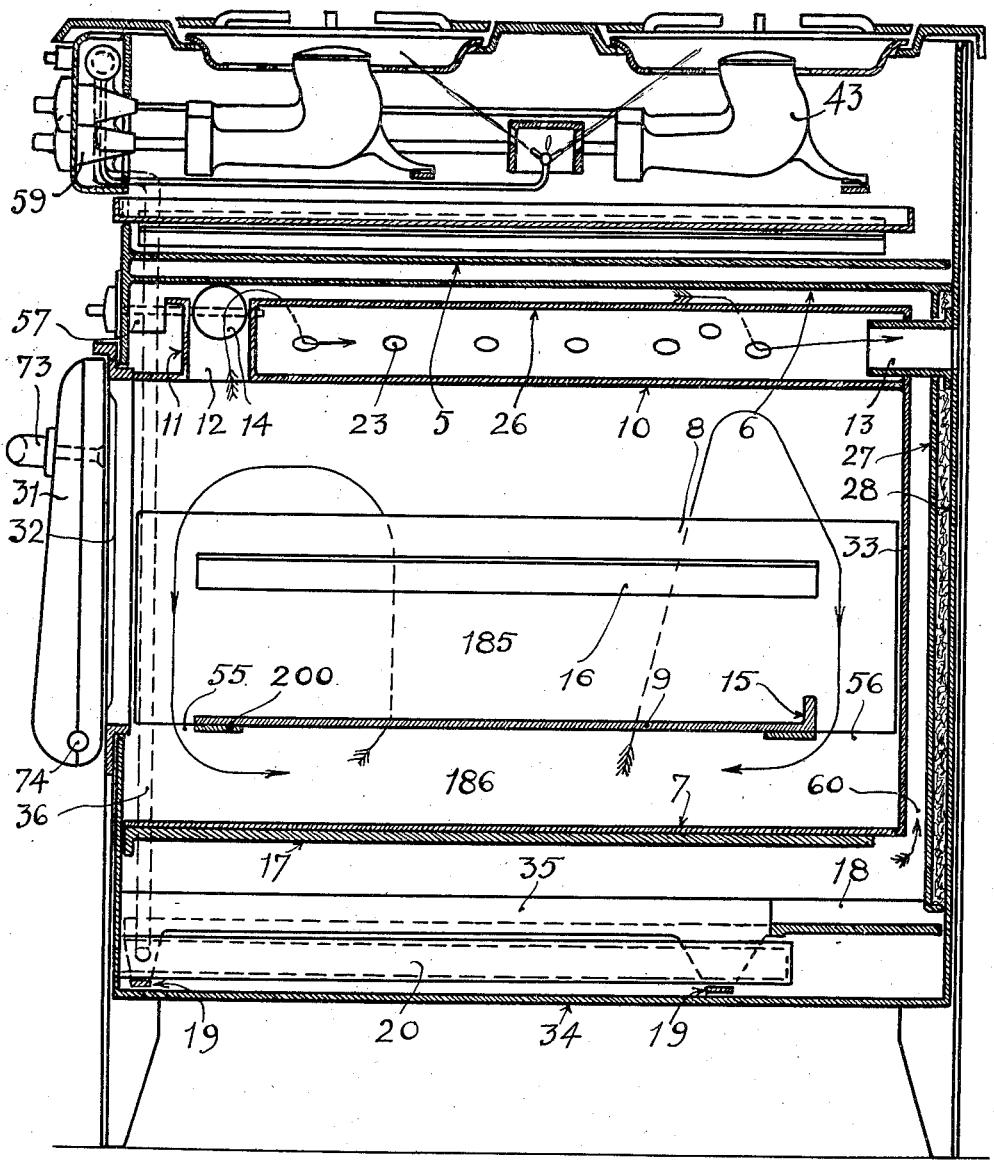
Fig. 1 is a central vertical section of a gas stove with a baking oven in a plane at right angles to the frontplate.

Referring to the drawings, 1 denotes the top plate of the stove beneath which gas burners 43 are arranged in a space 2. The main casing of the stove is formed by a jacket or the like 3 of plate construction and said stove is carried by legs 4 constructed of angle iron which extend upwardly to the top plate 1 and form corner pieces for the jacket 3. Within the jacket 3 a baking oven 54 is located, formed mainly by a casing or the like 7, around which two spaced jackets or the like 5 and 6 are arranged. The outermost jacket 5 is formed of sheet aluminium or the like and is adapted to serve as a heat reflector and a heat insulator. The space between the jacket 6 and the casing 7 is adapted to form a channel 52 for hot gases coming from a gas burner 20 disposed beneath the oven. Spacers or the like 24 are arranged in said channel 52 and in the space 53 between the jackets 5 and 6 heat insulating material such as crumpled aluminium foil or the like is provided. The oven 54 has substantially vertical sides but the lower corners are rounded off and the base thereof inclines slightly downwards towards the centre. The top of the oven is bounded by a flat or substantially flat plate or the like 10. On the outer side of the muffle oven 7 and adjacent the gas burner 20, a protecting plate or the like 17 of heat resisting material is provided.

Between the plate 10 and the upper part 26 of the muffle oven 7, a chamber 21 is formed which is adapted to convey hot gases from the channel 52 and from the interior of the oven to a flue. The part 26 is provided with a number of holes 23 which may be arranged in any desired manner and adjacent the front of the stove said part is cut away to form a slot or channel 57 which extends parallel to the front of said stove. The slot 57 forms a passage through which hot gases from the channel 52 may flow to the chamber 21. Hot gases also flow from channel 52 to the chamber 21 through the holes 23 but said holes offer more resistance to the gases than does the slot 57.

The oven 54 is adapted to communicate with the channel 52 through a channel 12 formed by a pipe 11 which is located near the front of the oven and extends between the plate 10 and the part 26. The channel 12 is controlled by a valve 14. A flap valve 40 (Fig. 3) may be provided which is adapted to pivot about an axis 42 and is provided with an element 41 against which a screw 129 may abut to open the flap when the screw 129 is moved relatively to the member 128 mounted on the door 131.

The oven 54 is bounded at the rear by a wall 33. Spaced from said wall 33 to form a channel 60 for flue gases is a further wall 27 formed of sheet aluminium or the like and beyond the wall 27 a further wall 28 is arranged, the space intermediate the walls 27 and 28 preferably being filled with heat insulating material such as aluminium foil. Even if no heat insulating material is arranged in the space between the walls 27 and 28, a very good insulating effect is obtained.

The oven 54 is provided with an inner compartment 185, in which the actual cooking of dishes for example of pastry takes place. This compartment 185, which is bounded by a base 9 and two side walls 8, is carried on supports 200 and is so constructed and arranged that channels 55 and 56 are formed between the edges of the base 9 and the front and rear of the oven respectively while channels 58 are formed between the walls 8 and the sides of said oven. Lugs 15 are adapted to support a dish or the like in a suitable position, while brackets 16 are provided to form supports for an upper shelf 187.

The dishes to be treated are placed in the inner compartment 185 on the base 9 or on the shelf 187. The space 186 beneath the base 9 will be strongly heated and the hot air will rise through the channels 58 in the direction of the arrows 138 to the upper part of the oven 54, where it will be cooled to some extent and thence return to the space 186 through channels 55 and 56. Thus, a very good circulation of air within the oven is obtained.

The oven is further provided with a door 31 pivotally mounted on pins or the like 74 and having on its inner side ridges or the like 32, on which oven plates may slide when the door is open. The door is also provided with handle 73.

The oven is heated by the burner 20, to which gas or other fuel may be supplied through a conduit 36 which on operation of a valve 59 communicates with a supply pipe 37 through a conduit 38.

The burner 20 is held in position by members 19, which are mounted on members 35 which in turn are secured to plates 18. The outer jacket 5 and the intermediate jacket 6 are rigidly secured to the members 35 and plates 18 respectively. Beneath the burner 20 a base plate 34 is removably mounted.

The gas jets 43 for direct heating are as abovementioned located in the space 2 beneath the top 1.

The operation of the oven is as follows: On initial heating the hot gases will rise through the channel 52, through the slot 57 and holes 23 to the chamber 21 and thence to the outlet 13. If the valve 14 is closed the interior of the oven will be cut off from the outside air except in the case when the door 31 is not tightly closed. There will, however, be a circulation of air within said oven as mentioned before since air will rise from the space 186 through the openings 58 to the top of the oven and on cooling will return to said space, 186 through the channels 55 and 56. On opening the valve 14 there will be an upward draught through the oven and the above circulation of gases will be interrupted. The valve 14 should be regulated according to the types of dishes being cooked, since some dishes require a much bigger draught than do others.

The baking oven may be of any suitable shape but the form shown in Figs. 1 and 2 possesses many advantages.

When burning fuel other than gas for example, wood, coal, coke, or the like, which needs a draught, it is advisable to provide a valve such as that illustrated in Fig. 3, which will close automatically on opening the oven door. In the arrangement shown in Fig. 3 the valve 40 may be operated, when the door 131 is closed, by varying the position of the screw 129. On opening the door 131 the screw 129 will be brought out of contact with the part 141 and the valve will automatically assume a closed position and thus prevent any circulation of cool air through the chamber 21 and consequent cooling of the oven. The part 41 may be rounded off at the points against which the screw 129 abuts in order to facilitate regulation.

I claim:—

In an oven construction arranged to give an equal heat in every part of a muffle oven, the combination of a closed shell, a muffle oven suspended within said shell in such a manner that channels for the hot flue gases are provided around the walls of the muffle oven, a heater arranged within said shell and below said muffle oven, means to evenly distribute the heating medium over the bottom and side walls and the upper side of the muffle oven and an inner food retaining compartment suspended within said muffle oven consisting of a substantially horizontal plate spaced from the bottom of the muffle oven and of such dimensions that channels are left between its edges and the bounding walls of said muffle oven, said plate being provided with two upwardly directed walls which extend throughout the depth of the oven and substantially parallel to the sides thereof to form channels for air circulating within said oven in a defined path upwardly through oppositely disposed side channels and downwardly through further oppositely disposed end passages separated from said channels by the upwardly directed walls.

TORD ERIK DANIEL BILDE.